United States Patent Office 2,739,957
Patented Mar. 27, 1956

2,739,957
PRODUCTION OF POLYETHYLENE TEREPHTHALATE USING AN ANTIMONY COMPOUND AS CATALYST

Harry R. Billica, Seaford, Del., and Jonathan Turner Carriel, Pittsburgh, Pa., assignors to E. I. du Pont de Nemours and Company, Wilmington, Del., a corporation of Delaware No Drawing. Application January 3, 1952,
Serial No. 264,852

5 Claims. (Cl. 260—75)

This invention relates to an improved method for preparing a synthetic linear polyester which is essentially the condensation product of a dihydric alcohol and a dibasic acid, and more particularly to the preparation of polyethylene terephthalate, a film- and fiber-forming synthetic linear polyester.

The production of the novel class of film- and fiber-forming, linear polyesters of terephthalic acid and a glycol of the series $HO(CH_2)_nOH$ where "$n$" is an integer from 2 to 10 inclusive, is fully disclosed in U. S. P. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxy-ethyl terephthalate monomer which is polymerized to polyethylene terephthalate under reduced pressure and at elevated temperatures.

The above patent discloses numerous compounds which are suitable in varying degree as catalysts in the ester interchange reaction. Compounds disclosed include lithium, sodium, potassium, calcium, magnesium, zinc, cadmium, aluminum, manganese, iron, nickel and antimony. The alkali metals, the alkaline earth metals and magnesium are conveniently used in the form of alcoholates, or in the form of carbonates or borates. Magnesium may also be used in the form of its oxide. However, in no instance do these suggested materials satisfactorily catalyze both the ester interchange and the polymerization cycles; and, where catalysis of the complete reaction is desired, these catalytic materials are not satisfactory.

An object of the present invention, therefore, is to provide a catalyst system for accelerating and controlling the reaction between ethylene glycol and dimethyl terephthalate, and the subsequent polymerization of the resulting product. A further object is to provide a catalyst system for accelerating both ester interchange and polymerization, and, at the same time, prevent color degradation of the polymer. These and other objects will more clearly appear hereinafter.

The above objects are accomplished according to the present invention by carrying out the ester interchange between ethylene glycol and dimethyl terephthalate and subsequent polymerization of the resulting bis-2-hydroxy-ethyl terephthalate under super polyester-forming conditions in the presence of catalytic amounts of a calcium compound and an antimony compound.

Any compound containing calcium is useful for purposes of this invention. The following examples are representative of the diverse types of suitable calcium compounds: calcium hydride, calcium oxide, calcium peroxide, calcium hydroxide, calcium carbide, calcium cyanamide, calcium salts of inorganic acids, such as calcium bromide, calcium borate, calcium tungstate, calcium titanate, calcium silicate, and calcium salts of organic acids, such as calcium formate, calcium acetate, calcium hydroxyacetate, and calcium stearate. The colorless or white compounds which dissolve in the reaction mixture, for example, calcium acetate, and calcium hydroxide are particularly preferred. In comparison with previously proposed catalysts (e. g., litharge), the use of calcium compounds permits lower ester interchange reaction temperatures; and the color of the intermediate and final product is correspondingly improved. The calcium compound should be used in amounts designed to provide from 0.00035 to 0.011 of an atom of calcium per mol of dimethyl terephthalate (0.033% to 1% by weight of hydrous calcium acetate based on dimethyl terephthalate), the preferred range being 0.001 to 0.003 of an atom of calcium per mol of dimethyl terephthalate. Lesser amounts of the catalysts are decreasingly effective in promoting a rapid reaction; and larger amounts do not increase the reaction rate proportionately, if at all, and may even give poor color.

The calcium compounds appear to primarily catalyze the ester interchange reaction; whereas, the antimony compounds function mainly as polymerization catalysts and have little or no effect on the ester exchange reaction. Consequently, the latter may be added together with the calcium compounds at the beginning of the reaction; or they may be added after the ester exchange is complete. As in the case of calcium compounds, any compound of antimony is suitable for purposes of this invention. The preferred antimony compounds are the colorless or white compounds in which antimony exhibits the valence of three; for example, antimony trioxide, antimonous oxychloride, antimony trifluoride, sodium antimony hydroxy acetate, and antimonyl potassium tartrate. The antimony compound should be used in amounts designed to provide from 0.0003 to 0.0013 of an atom of antimony per mol of dimethyl terephthalate (0.023 to 0.10% by weight of antimony trioxide, based on dimethyl terephthalate). Again, lesser amounts of the catalysts are decreasingly effective; and larger amounts do not increase the reaction rate proportionately, if at all, and may even give lower viscosity and/or poorer color. Of the antimony compounds mentioned, antimony trioxide and antimonyl potassium tartrate (tartar emetic) are preferred. The latter is soluble in cold glycol and is particularly useable in continuous polymerization, especially in the final stages when the polymer melt is very viscous and agitation is necessarily reduced.

The following examples of preferred embodiments will serve to illustrate the principles and practice of this invention. Parts are by weight unless otherwise indicated:

EXAMPLE I

This example illustrates the use of various combinations of calcium and antimony compounds as catalysts in the preparation of polyethylene terephthalate from dimethyl terephthalate (DMT) and ethylene glycol. The results are recorded in Table I. A control experiment using litharge, heretofore employed as a catalyst in the preparation of polyethylene terephthalate, is included for comparison.

The reaction in each case was performed in the following manner: fifty parts of dimethyl terephthalate and 55 parts of ethylene glycol and the indicated amount of catalysts were heated in a three-neck flask, equipped with a stirrer and a condenser, at atmospheric pressure until the evolution of methanol stopped. The temperature of the reaction mixture/was fixed at any given time by its boiling point at atmospheric pressure. The third column in the table records the temperature range during the evolution of methanol, the first temperature being that at which the evolution of methanol started, and the final temperature being that of the reaction mixture when the evolution of methanol ceased. The time for completion of the initial exchange reaction is recorded in the fourth column of the table as the time for evolution of methanol. At the end of methanol evolution, 15 to 20 parts of the liquid in the flask were placed in a polymerization tube and heated at 275° C. under a vacuum of 0.5 to 1.0 mm. of mercury for two hours and, in some cases, for seven hours. The material in the polymerization tube was agitated continually by bubbling nitrogen through it. The color of the polymer melt was determined by comparison with arbitrary color standards prepared by dissolving known amounts of Du Pont Pontamine Catechu 3G dye in a fixed amount of water. The color ratings are as follows:

0=water.
1=0.00025 gram of dye per 100 ml. of solution.
2=twice as much dye as 1.
3=three times as much dye as 1.
4=four times as much dye as 1.

The intrinsic viscosity of the polymer plug, as noted in the last column of the table, was determined in dilute solutions of the polymer in Fomal, which comprises 58.8 parts by weight of phenol and 41.2 parts by weight of trichlorophenol.

*Table 1*

| Catalyst | Atoms of Catalyst per mol of DMT | Temp. range during exchange reaction °C. | Time to evolve methanol, hrs. | Hrs. at full vacuum | Melt Color | [N]F |
|---|---|---|---|---|---|---|
| 0.005 part litharge | | 186–220 | 3.1 | 2 | 2 | .35 |
| | | | | 7 | 4+ | .47 |
| 0.065 part calcium acetate | 0.0014 | 135–223 | 1.3 | 2 | 0 | .45 |
| 0.015 part antimony trioxide | 0.0004 | | | 7 | 1 | .77 |
| 0.015 part calcium hydride | 0.0014 | 115–215 | 1.6 | 2 | 0 faint | .44 |
| 0.015 part antimony trioxide | 0.0004 | | | | | |
| 0.015 part calcium hydroxide | 0.0013 | 134–218 | 2.6 | 2 | gray 1+ | .38 |
| 0.025 part antimony trioxide | 0.0007 | | | | | .42 |
| 0.065 part calcium acetate | 0.0014 | 164–224 | 1.5 | 2 | | |
| 0.025 part potassium antimonyl tartrate | 0.0003 | | | 7 | 3 | .75 |
| 0.065 part calcium acetate | 0.0014 | 172–218 | 1.1 | 7 | 3+ | .73 |
| 0.035 part sodium antimony hydroxy acetate | 0.0003 | | | | | |

EXAMPLE II

The following ingredients were introduced into a stainless steel batch still equipped with a stirrer and a condenser:

Dimethyl terephthalate, 58 lbs.
Ethylene glycol, 40 lbs.
Calcium hydride, 0.0174 lbs. (0.0014 atom of calcium per mol of DMT).
Antimony trioxide, 0.0174 lbs. (0.0004 atom of antimony per mol of DMT).

The ester-exchange reaction started at 118° C., and 3.5 hours were required to remove the methanol formed. The resulting material, principally bis-2-hydroxy-ethyl terephthalate, was transferred to a 50-pound stainless steel autoclave equipped with a stainless steel stirrer and heated to about 275° C.

The autoclave was evacuated gradually through an ice trap and a Dry Ice trap; and when the pressure in the autoclave was reduced to about 0.5 mm. of mercury, the polymerization was carried out for 5.1 hours at this full vacuum. The intrinsic viscosity of the resulting polymer as measured in Fomal was 0.66, and the polymer had a very pale green tint.

EXAMPLE III

The procedure of Example II was repeated except that the catalyst employed was 0.0058 lb. of litharge (0.01% by weight of dimethyl terephthalate). The ester-exchange reaction began at 170° C. and required 4.5 hours for complete removal of methanol. The subsequent polymerization required 9.3 hours at full vacuum to obtain polyethylene terephthalate having an intrinsic viscosity of 0.66. The color of this polymer was a medium amber, much darker than that of the polymer of the previous example.

EXAMPLE IV

The following ingredients were introduced into a stainless steel batch still equipped with a stirrer and a condenser:

Dimethyl terephthalate, 240 lbs.
Ethylene glycol, 155 lbs.
Calcium acetate (containing one mol of $H_2O$ per mol of calcium acetate), 0.312 lb. (0.0014 atom of calcium per mol of DMT).
Potassium antimonyl tartrate, 0.12 lb. (0.0003 atom of antimony per mole of DMT).

The ester-exchange reaction began at 121° C. and required 4.0 hours to complete the removal of methanol. The resulting bis-2-hydroxy-ethyl terephthalate was transferred to a 250-pound stainless steel autoclave equipped with a stainless steel stirrer. The autoclave was evacuated gradually through an ice trap and a Dry Ice trap while the temperature of the batch was raised to about 275° C. When the pressure in the autoclave was reduced to about 0.5 mm. of mercury, the polymerization was carried out for 7.25 hours at this full vacuum. The intrinsic viscosity of the resulting polymer was 0.58 as measured in Fomal. The color of the polymer melt was very pale green.

EXAMPLE V

The procedure of Example IV was repeated except that the potassium antimonyl tartrate was replaced by 0.072 lb. of antimony trioxide (0.0004 atom of antimony per mol of DMT). The ester-exchange reaction started at 148° C. but took only 2.6 hours for complete removal of methanol. The polymerization at full vacuum required 7.1 hours to reach a polymer of intrinsic viscosity of 0.55. The color of the polymer melt was also very pale green.

It is to be understood that the foregoing examples are merely illustrative and that the present invention broadly comprises conducting an ester interchange and subsequent polymerization of the resulting bis-2-hydroxyethyl terephthalate under super polyester-forming conditions in the presence of catalytic amounts of calcium compounds and antimony compounds.

The initial condensation may be regarded essentially as a simple ester interchange and may be conveniently carried out at atmospheric pressure and at a temperature range between 100–260° C. and, preferably, between 130–235° C. The reaction may also be carried out under pressures above and below atmospheric pressure, if desired.

Polymerization may be effected in either the liquid (i. e., melt) or solid phase. In the liquid phase, the reaction must be carried out at reduced pressure in the vicinity of 0.05–20 mm. of Hg with a range 0.05–5.0 mm. Hg preferred for optimum results. This reduced pressure is necessary to remove free ethylene glycol which emerges from the polymer as a result of the condensation reaction, since the reaction mixture is very viscous. A temperature between 230–290° C. and, preferably, between 260–275° C., should be maintained during the polymerization step.

The catalyst system of the present invention is particularly effective for polymerization of relatively large batches of monomer. Furthermore, the catalyst system is highly useful in accelerating ester interchange and polymerization when carried out continuously. By comparing the color grade of the polymers produced in Examples II and III, it is obvious that the color of the polymer prepared in the presence of litharge alone would generally not be acceptable for conversion into filaments and, particularly, for conversion into film. On the other hand, by using the catalyst system of the present invention, polymer of acceptable color for commercial use can be prepared in a shorter time than with litharge alone.

While dimethyl terephthalate is the preferred ester monomer, and the present invention has been described with particular reference to this starting material, the catalyst system of this invention also effectively catalyzes the ester interchange between ethylene glycol and terephthalate esters of saturated aliphatic monohydric alcohols containing up to and including 4 carbon atoms, e. g., diethyl, dipropyl and di-isobutyl terephthalates.

As many different embodiments may be made without departing from the scope and spirit of my invention, it is to be understood that the invention is in no way restricted save as set forth in the appended claims.

We claim:

1. In the process for producing filament- and film-forming polyethylene terephthalate wherein ethylene glycol is reacted under ester interchange conditions with an alkyl ester of terephthalic acid and a saturated aliphatic monohydric alcohol containing from 1 to 4 carbon atoms, and the resulting glycol terephthalate is polymerized, the improvement which comprises carrying out the ester interchange reaction in the presence of a catalyst comprising essentially at least one calcium compound and carrying out the polymerization reaction in the presence of a catalyst consisting of at least one calcium compound and at least one antimony compound.

2. The process of claim 1 wherein the catalyst system consists of a calcium compound providing from 0.00035 to 0.011 of an atom of calcium per mol of the alkyl ester of terephthalic acid, and an antimony compound providing from 0.0003 to 0.0013 of an atom of antimony per mol of alkly ester of terephthalic acid.

3. The process of claim 1 wherein the calcium compound and the antimony compound are both incorporated in the initial reaction mixture of the monomeric ester and alcohol reactants.

4. In the process for producing filament- and film-forming polyethylene terephthalate wherein ethylene glycol is reacted under ester interchange conditions with dimethyl terephthalate, and the resulting glycol terephthalate is polymerized, the improvment which comprises carrying out the ester interchange reaction in the presence of a catalyst comprising essentially a calcium compound providing from 0.00035 to 0.011 of an atom per mol of dimethyl terephthalate and carrying out the polymerization reaction in the presence of a catalyst system consisting of said calcium compound and an antimony compound providing from 0.0003 to 0.0013 of an atom of antimony per mol of alkyl ester of terephthalic acid.

5. The process of claim 4 wherein the catalyst system consists of a calcium compound providing from 0.001 to 0.003 of an atom of calcium per mol of dimethyl terephthalate, and an antimony compound providing from 0.0003 to 0.0013 of an atom of antimony per mol of the dimethyl terephthalate.

References Cited in the file of this patent

UNITED STATES PATENTS

| | | |
|---|---|---|
| 2,465,319 | Winfield et al. | Mar. 22, 1949 |
| 2,534,028 | Izard | Dec. 12, 1950 |
| 2,647,885 | Billica | Aug. 4, 1953 |